(12) United States Patent
Marwege et al.

(10) Patent No.: US 6,523,577 B2
(45) Date of Patent: Feb. 25, 2003

(54) INSULATION SYSTEM FOR SHAFTS THROUGH WHICH HOT GASES FLOW

(75) Inventors: Henning Marwege, Bremen (DE); Jörg Nordholt, Bremen (DE); Marcial Navarro, Bremen (DE); Ernst Wermuth, Bremen (DE); Stephan Tonne, Bremen (DE); Josef Haider, Bremen (DE); Thomas Heuermann, Ganderkesee (DE); Uwe Naumann, Bremen (DE)

(73) Assignee: Kaefer Isoliertechnik GmbH & Co. KG (DE)

( * ) Notice: Subject to any disclaimer, the term of this patent is extended or adjusted under 35 U.S.C. 154(b) by 15 days.

(21) Appl. No.: 09/826,195

(22) Filed: Apr. 4, 2001

(65) Prior Publication Data
US 2001/0029991 A1 Oct. 18, 2001

(30) Foreign Application Priority Data
Apr. 5, 2000 (DE) .......... 100 16 800

(51) Int. Cl.$^7$ .......... F16L 59/12
(52) U.S. Cl. .......... 138/149; 138/147; 285/47
(58) Field of Search .......... 138/147, 149; 285/47

(56) References Cited

U.S. PATENT DOCUMENTS 3,822,636 A * 7/1974 Chadwick .......... 110/184
4,475,749 A * 10/1984 Pforr et al. .......... 138/149
4,582,094 A * 4/1986 Stausebach .......... 138/147
5,460,206 A * 10/1995 Sansoucy .......... 138/149
5,935,517 A * 8/1999 Roll et al. .......... 138/148

FOREIGN PATENT DOCUMENTS

| DE | 33 45 966 A1 | 6/1985 |
| DE | 41 42 178 A1 | 6/1993 |
| DE | 42 25 448 A1 | 2/1994 |
| DE | 196 31 291 A1 | 2/1998 |

* cited by examiner

Primary Examiner—Patrick Brinson
(74) Attorney, Agent, or Firm—McGlew and Tuttle, P.C.

(57) ABSTRACT

An insulation system for shafts through which hot gases flow, especially exhaust gas shafts of gas turbines has an insulation layer (20, 40) as well as a flat cover (26, 39), which holds the insulation layer (20, 40) and covers it against the gas flow. The cover (26, 39) is guided by bearing rails (21, 41). In such an insulation system, the number of spacers (22, 23, 24; 47, 48, 49) by which the bearing rails (21, 41) are fastened to a shaft wall (25, 50) shall be minimized. Furthermore, the insulation system shall be able to be manufactured with a high degree of prefabrication in the workshop and with low assembly effort at the construction site. The bearing rails (21, 41) are fastened to the shaft wall (25, 50) with a fixed mount (31, 51) and at least one movable mount (32, 52).

17 Claims, 11 Drawing Sheets

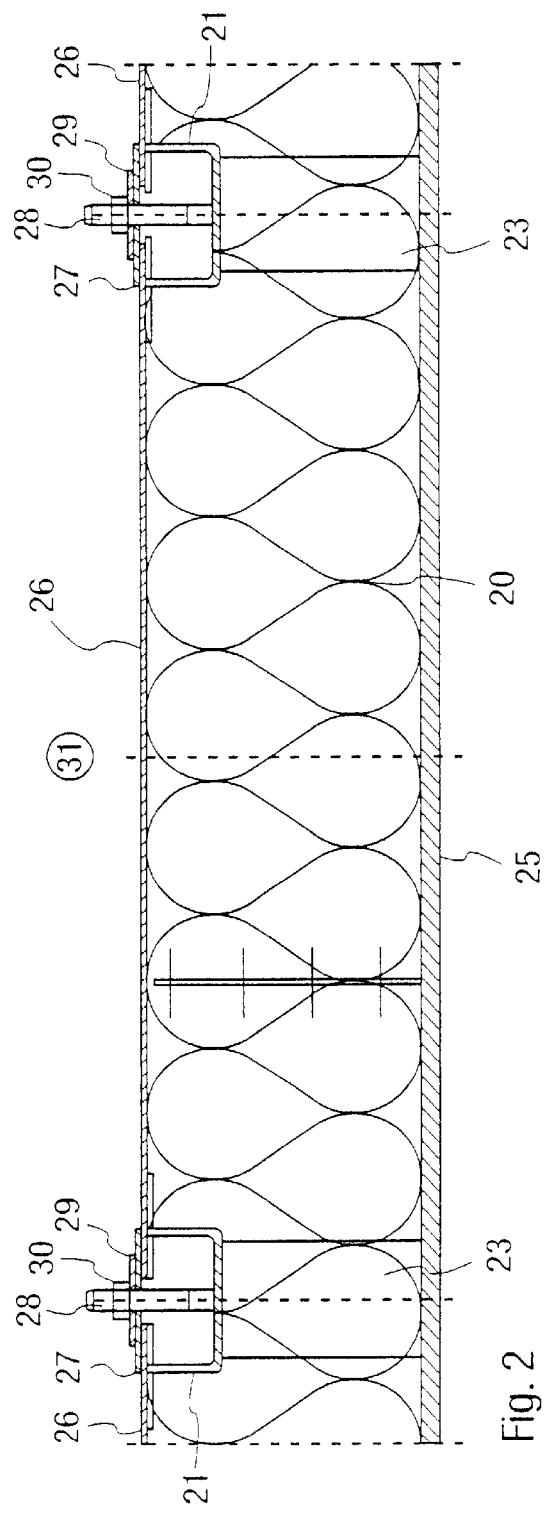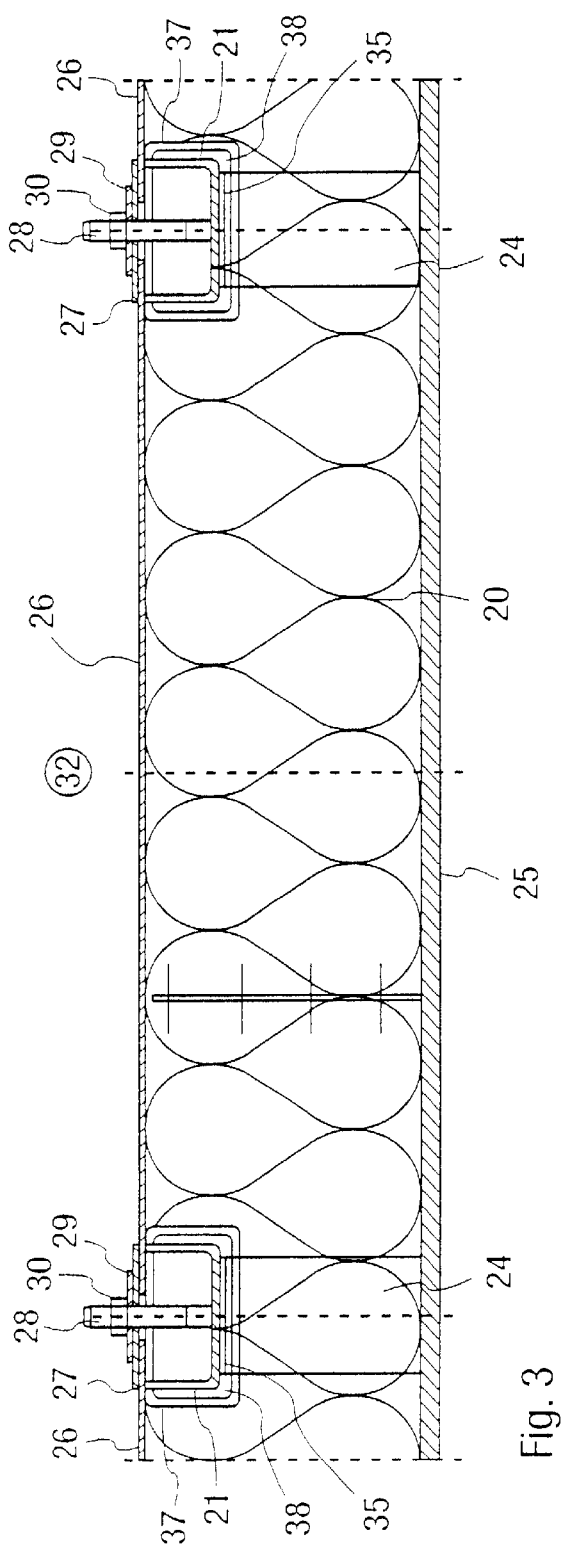

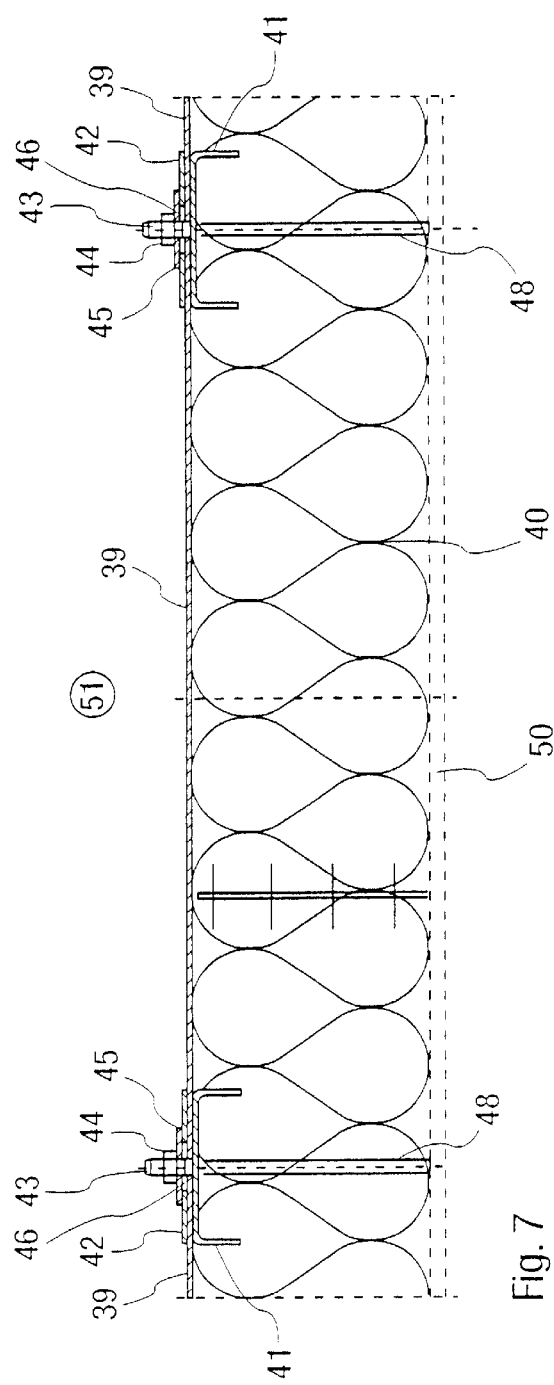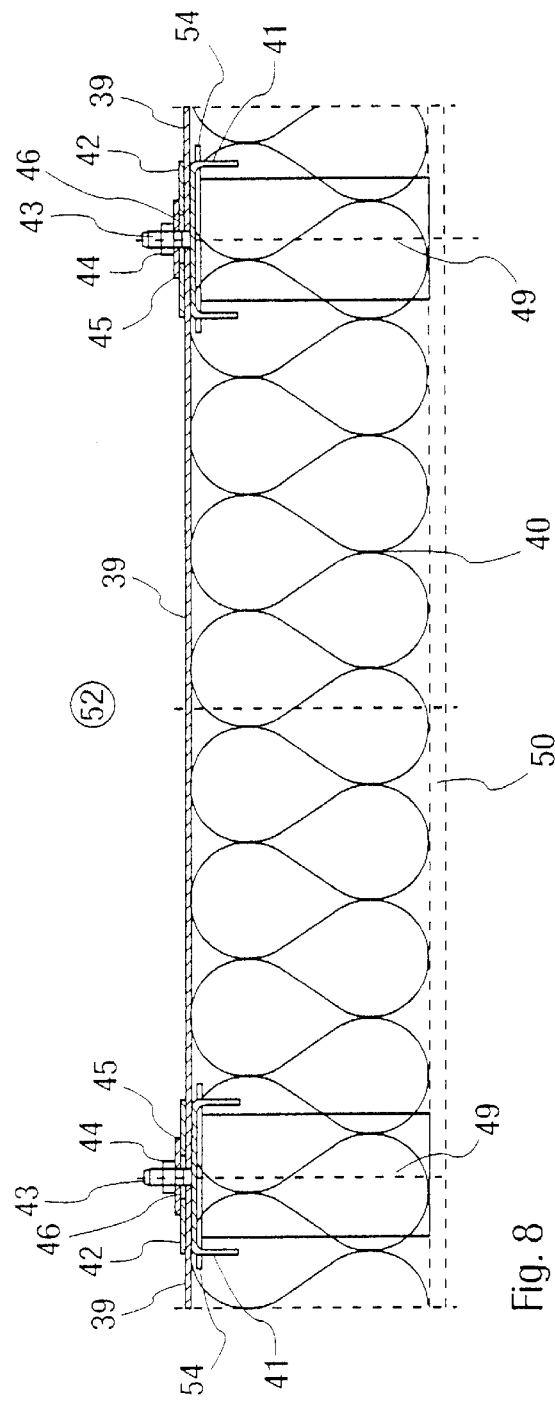

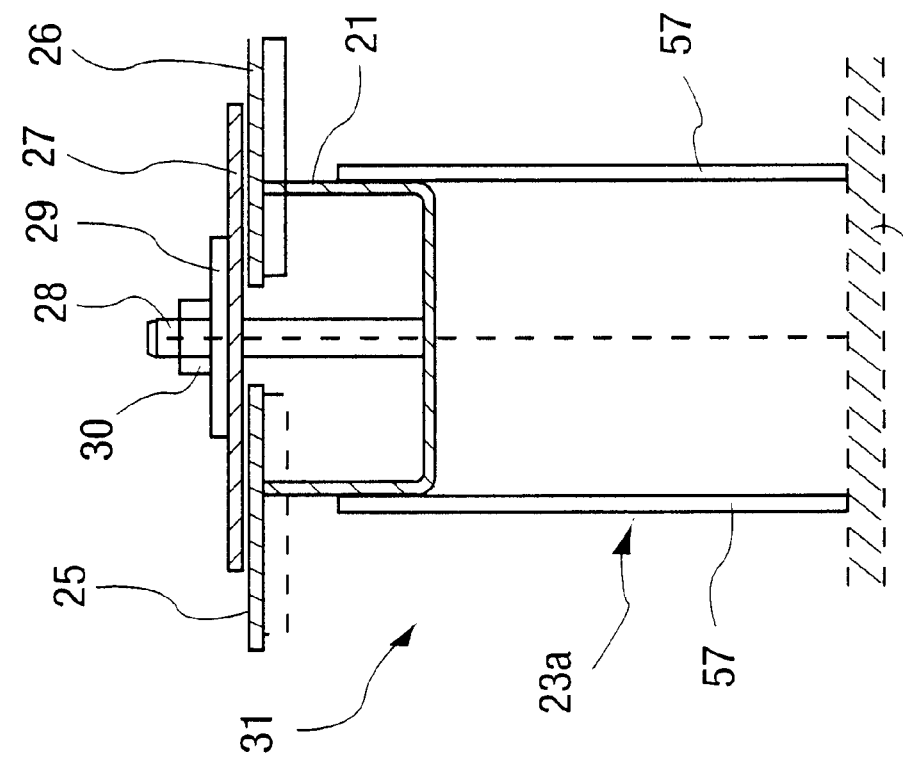
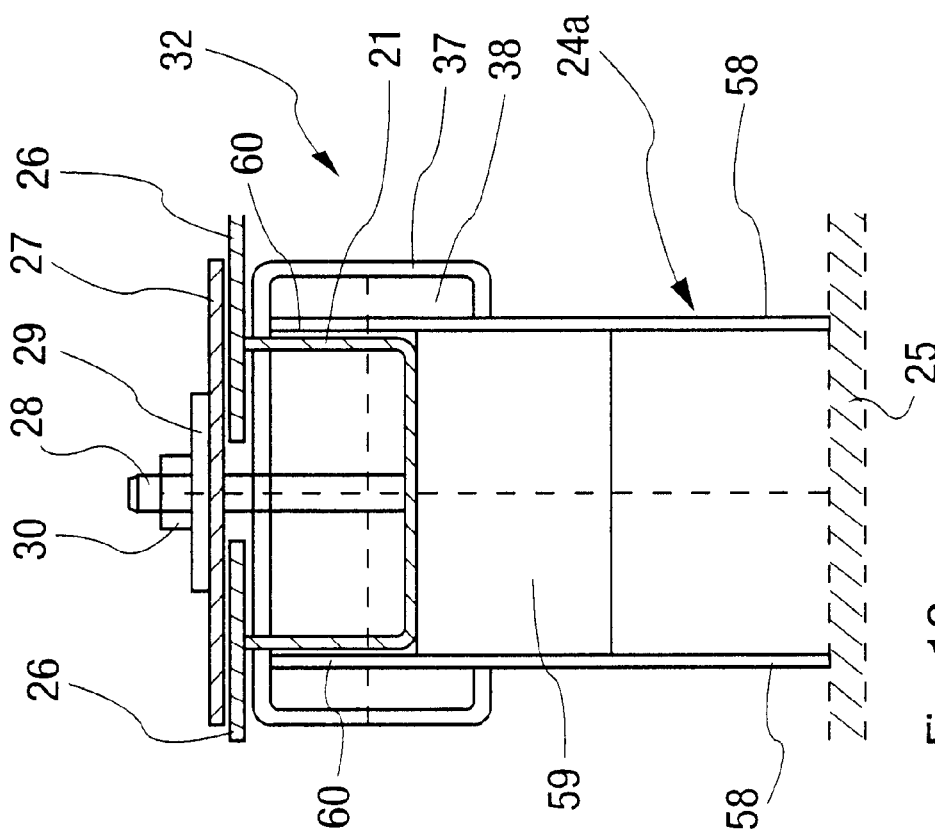
Fig. 13
Fig. 12

INSULATION SYSTEM FOR SHAFTS THROUGH WHICH HOT GASES FLOW

FIELD OF THE INVENTION

The present invention pertains to an insulation system for shafts through which hot gases flow, especially exhaust gas shafts of gas turbines with an insulation layer as well as a flat cover, which holds the insulation layer and covers it against the gas flow, wherein the cover is guided by bearing rails.

BACKGROUND OF THE INVENTION

Such insulation systems are used in the diffusor and flue area of gas turbines. The insulation systems are exposed to gases with high temperatures above 400° C. in these areas. In addition, there is a high velocity of flow above 30 m/sec in the diffusor area of the gas turbine. As a result, high thermal and dynamic stresses occur on the insulation system, especially on its holding systems, the cover, the bearing rails, fastening bars (spacers) for fastening the bearing rail on a wall of the shaft, etc.

The cover, the bearing rails and other fastening parts of the insulation system are usually made of a temperature-resistant metal with respect to the temperatures occurring. This also applies to the spacers, by which the bearing rails are fastened to the shaft wall. Thus, the spacers form heat bridges, through which the heat can be transported from the exhaust gas flow of the gas turbine into the shaft wall, because spacers made of metal are good heat conductors. It is therefore important to use as few spacers as possible. This goal is achieved, in principle, already by the use of bearing rails to which the cover for holding the insulation layer is fastened. The bearing rails have sufficient inherent stiffness to securely hold the cover. At the same time, the bearing rails and the cover must have a sufficient possibility of movement while still ensuring a secure hold in order to compensate even great temperature variations by thermal expansion and dynamic stresses.

In insulation systems of this type which are known from practice, this is guaranteed by the bearing rails being connected to the spacers with a certain clearance when viewed in the longitudinal direction of the bearing rails. Moreover, it is known that spacers can be made of a flat steel, in which case the flat steel is arranged in a plane extending transversely at right angles to the longitudinal axis of the bearing rails. Axial expansions in the bearing rail can thus be compensated by the bending of the flat steel. However, considerable stresses, especially bending stresses on the spacers, still continue to occur in these systems, so that a large number of spacers still continues to be necessary. In addition, the prior-art systems have the drawback that a considerable manufacturing effort is associated with them but the degree of prefabrication is low. The prior-art systems must be assembled almost exclusively at the construction site.

SUMMARY AND OBJECTS OF THE INVENTION

Based on this, the primary object of the present invention is to improve an insulation system of the type mentioned in the introduction such that the number of spacers by which the bearing rails are fastened to the shaft wall is minimized and they can be manufactured in the workshop with a high degree of prefabrication with low assembly effort at the construction site.

To accomplish this object, the insulation system according to the present invention is characterized in that the bearing rails are fastened to the shaft wall with a fixed mount and at least one movable mount.

The bearing rail is fixed by the insulation system according to the present invention in at least one point, while it is freely movable in its longitudinal direction in the other fastening points designed as movable mounts. Each bearing rail is thus mounted in a statically defined manner at each temperature and consequently at each amount of thermal expansion. Bending stresses acting on the spacers cannot occur, so that it is possible to work with a minimum of spacers. Depending on the length of the bearing rails, even one fixed mount and one movable mount are sufficient. These can be prefabricated almost completely in the workshop and then be assembled completely at the construction site.

It is particularly favorable for the bearing rail to be fastened to the shaft wall with an approximately central fixed mount and two outer movable mounts. The bearing rail is fixed approximately in the middle and can expand freely as a consequence of thermal expansion in both directions. It is, of course, also possible to provide a plurality of movable mounts on both sides in the case of longer bearing rails.

According to a variant of the present invention, the cover is connected to the bearing rails in a non-positive manner, especially by means of clamping strips. The cover is thus also able to expand freely during temperature variations without unacceptable thermal stresses building up. It is particularly favorable for the cover itself to be connected to the bearing rail in a positive-locking manner in the area of the fixed mounts of the bearing rails. According to one design embodiment of the present invention, this is accomplished by providing a notch in the bearing rail in the area of the fixed mount, which notch is engaged by a projection on the cover in a positive-locking manner.

Further features of the present invention pertain to design details of the movable mount and to the fastening of the cover to the bearing rails.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a vertical sectional view through the insulation system according to FIG. 1 in plane II—II;

FIG. 3 is a vertical sectional view through the insulation system according to FIG. 1 in plane III—II;

FIG. 7 is a vertical sectional view through the insulation system according to FIG. 6 in a plane VII—VII;

FIG. 8 is a vertical sectional view through the insulation system according to FIG. 6 in a plane VIII—VIII;

FIG. 12 is a horizontal sectional view through the movable mount area according to FIG. 11; and FIG. 13 is a horizontal sectional view through the fixed mount area according to FIG. 11.

DESCRIPTION OF THE PREFERRED EMBODIMENTS

Figure 1:
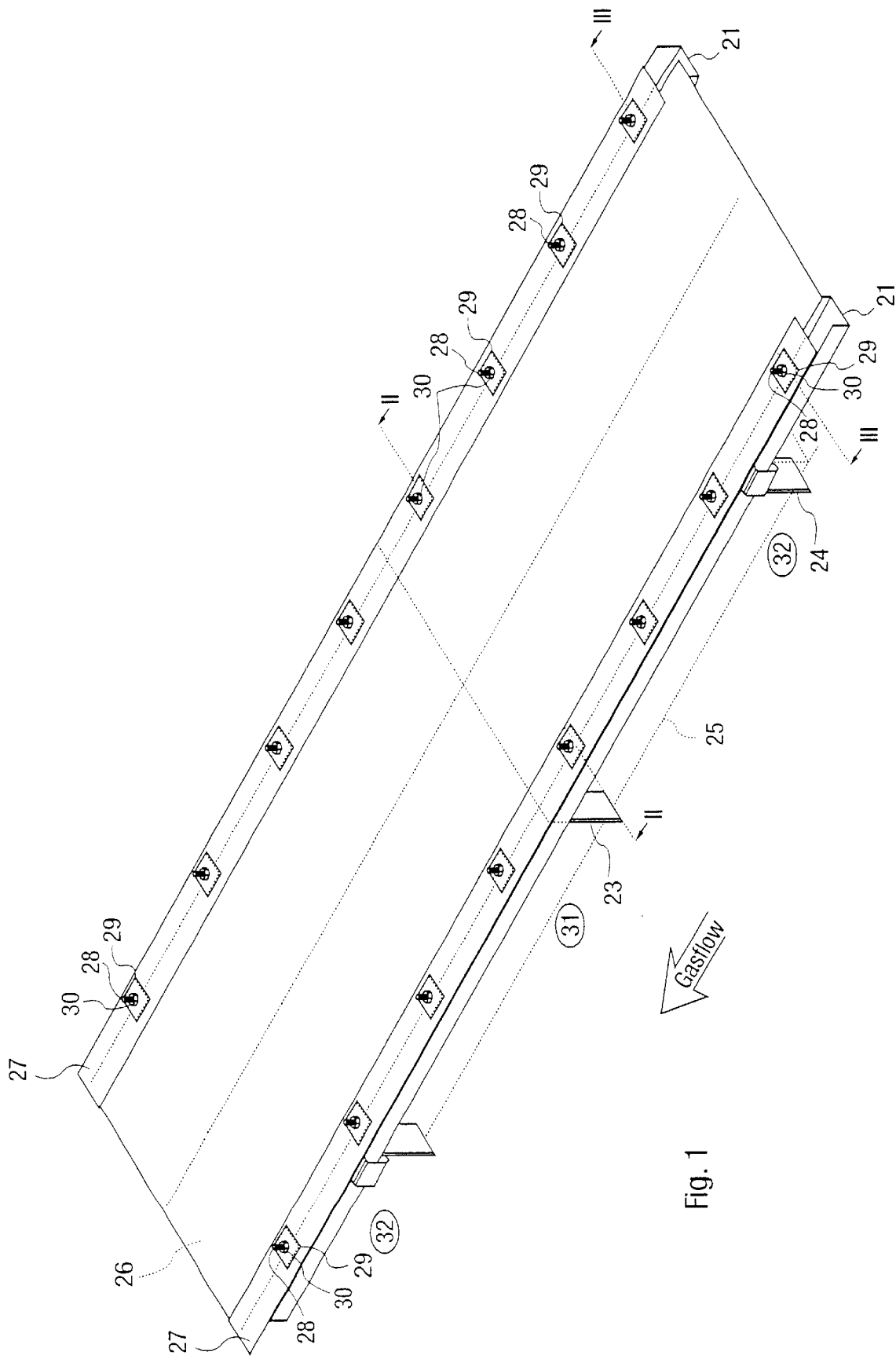
FIG. 1 is a perspective top view of an exemplary embodiment of an insulation system with the features of the present invention.

Referring to the drawings in particular, the exemplary embodiments of an insulation system shown in FIGS. 1 through 10 are used mainly in exhaust gas shafts for gas turbines. The exemplary embodiment of the insulation system shown in FIGS. 1 through 5 is used especially in the range of higher pressures and pressure variations of such an exhaust gas shaft and because of the high flow velocities of the exhaust gas above 30 m/sec which occur here, while the exemplary embodiment shown in FIGS. 6 through 10 is used preferably in the area of the flue.

Figure 6:
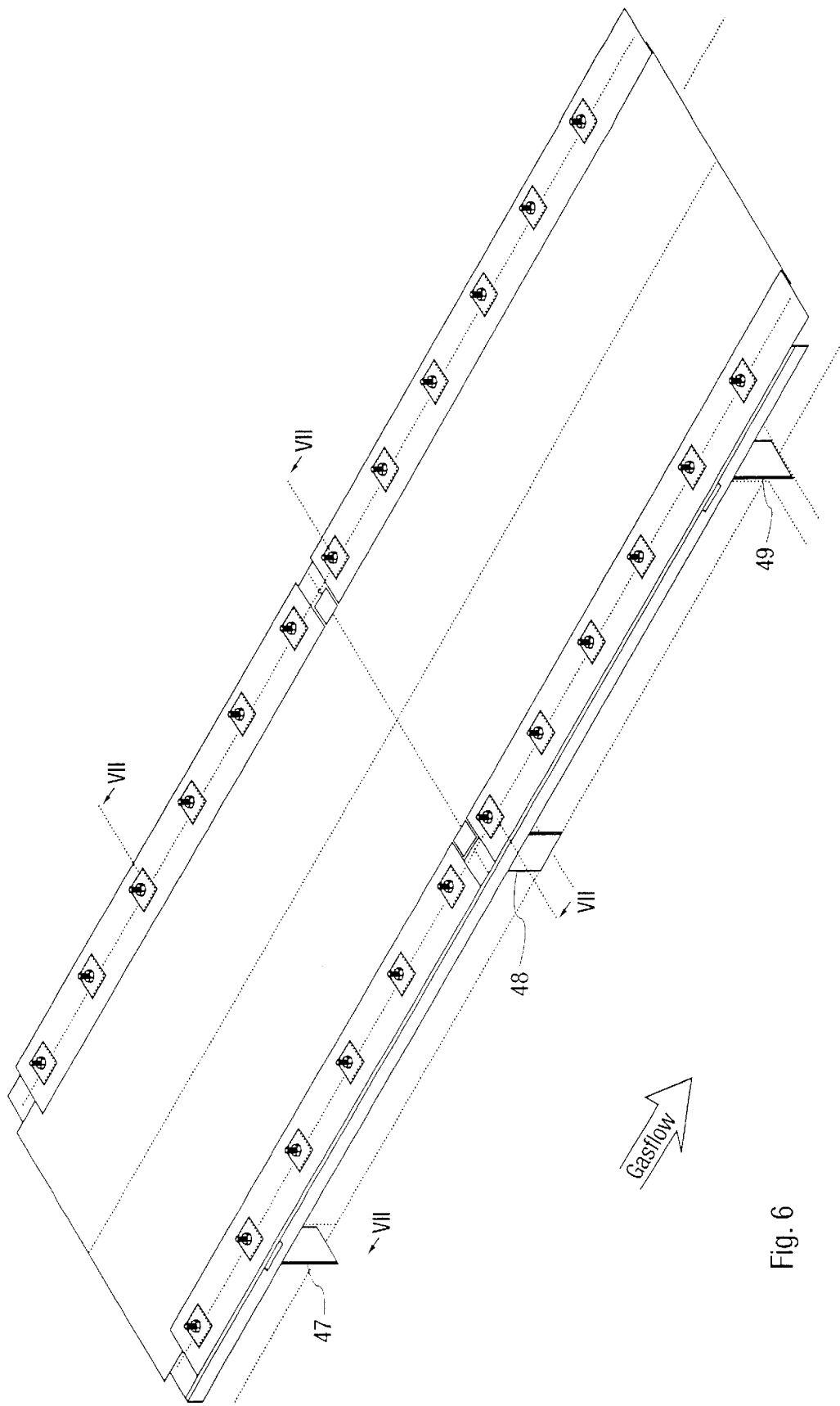
FIG. 6 is a perspective top view of another exemplary embodiment of an insulation system with the features of the present invention.

FIGS. 1 and 6 show a "web" of an insulation system. The complete insulation system always comprises a plurality of webs arranged in front of and next to one another.

FIG. 1 shows a detail, namely, a "web" of an insulation system in which the insulation layer 20 proper (see FIGS. 2 and 3) is omitted for reasons of greater clarity. The bearing rails 21 are fastened in this case via three spacers 22, 23 and 24 to a shaft wall 25.

An essentially flat, but optionally curved cover 26 is used to hold and cover the insulation 20. The cover 26 lies with its longitudinal side edges on two adjacent bearing rails 21 and is held by four clamping strips 27. The cover 26 is held by this structure "floatingly" between the bearing rail 21 and the clamping strip 27. This means that the cover 26 can move freely in relation to the bearing rails 21 as a consequence of thermal expansions, so that no stress leading to warping of the cover 26 or at least no appreciable stresses can occur within the cover 26. The bearing rail 21 has a U-shaped cross section with an upwardly open U for this purpose. The covers 26 lie on the free legs of the U-shaped bearing rail 21, so that a linear contact with minimal frictional force is obtained between the covers 26 and the bearing rail 21.

The clamping strips 27 may shift, optionally with the covers 26, in relation to the bearing rails as a consequence of the thermal expansion of the covers, but also to compensate their own thermal expansion. This is accomplished as follows:

Stay bolts 28 are welded to the U-shaped bearing rail 21. The stay bolts 28 are passed through between two adjacent covers 26. The distance between the two adjacent covers 26 and the distance between the covers 26 and the stay bolt 28 is selected to be such that the covers 26 can expand freely in the temperature range to be expected. This distance can be calculated using the coefficient of thermal expansion of the material for the covers 26 or be determined experimentally. The stay bolt 28 is then passed through a hole in the clamping strip 27 placed on the two adjacent covers 26. One of the holes in the clamping strip 27 corresponds to the diameter of the stay bolt 28, while the other holes in the clamping strip 27 are so large that they permit a free thermal expansion of the clamping strip 27 without unacceptable stresses leading to warping in the clamping strip 27 building up. Instead of a round hole, it is, of course, also possible to provide elongated holes of a sufficient length in the clamping strip 27. However, it is less expensive for manufacturing technical reasons to punch or drill simple round holes. The diameter of the holes in the clamping strip 27 is again calculated corresponding to the coefficient of thermal expansion of the material of the clamping strip 27 or is determined experimentally. The holes in the clamping strip 27 are then covered with washer 29, which are square in this case, and the clamping strip 27 is screwed together with the washer 29 and the covers 26 by means of a nut 30, which is, e.g., a self-locking nut.

In the area of the spacer 23, the spacer 23 is connected to the bearing rail 21, on the one hand, and the bearing rail 21 is connected to the cover 26, on the other hand, such that the cover 26 is mounted as a fixed mount 31 when viewed in the longitudinal direction of the bearing rails 21. In the area of the outer spacers 22, 24, the bearing rail 21 is mounted in the manner of a movable mount 32. The bearing rail 21 is thus also able to expand freely as a consequence of temperature variations without thermal stresses, or at least unacceptably high thermal stresses building up.

Figure 4:
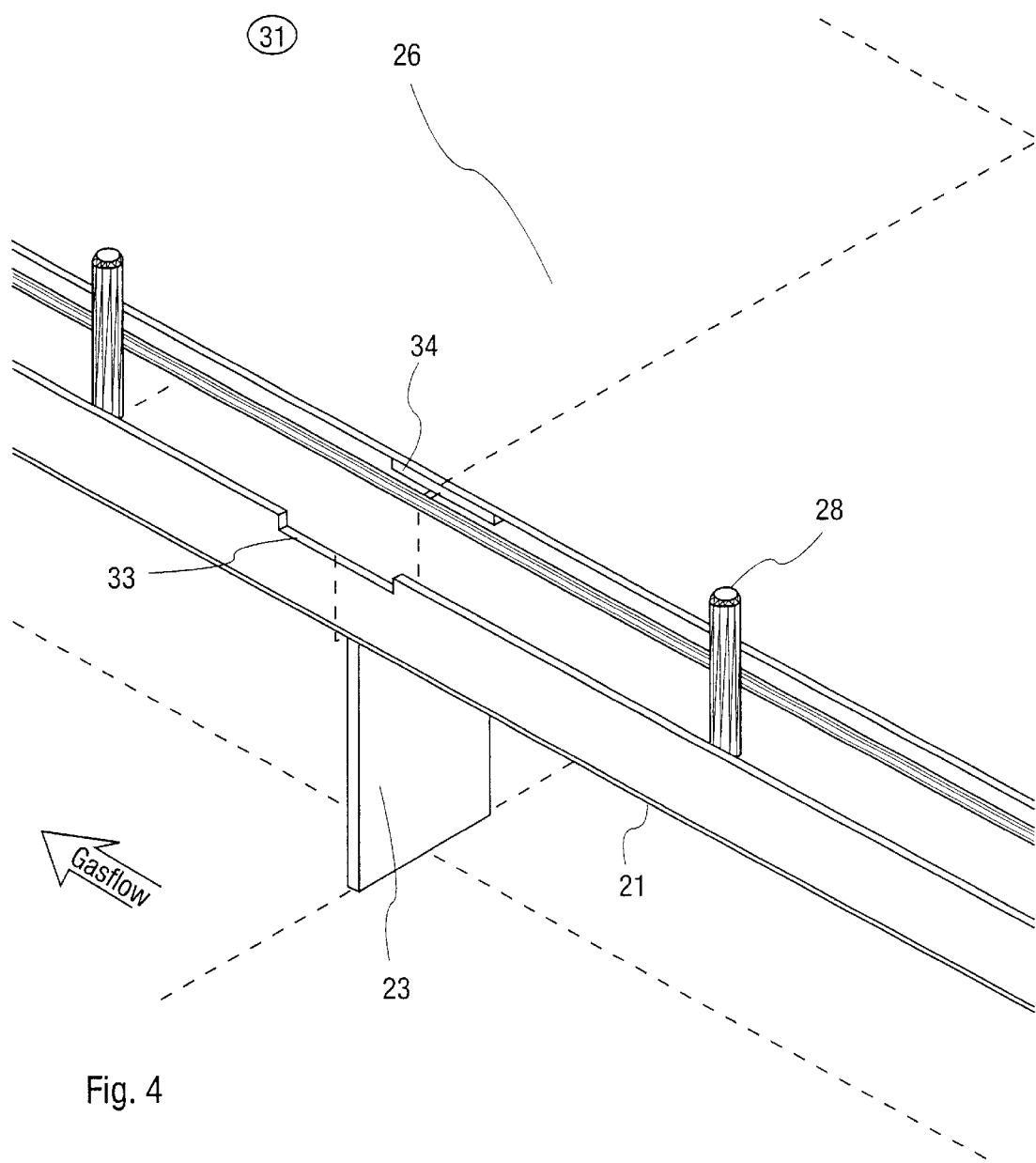
FIG. 4 is a perspective view of a fixed mount area of the insulation system according to FIG. 1 in the partially assembled state.

The fixed mount 31 is designed as shown in FIGS. 2 and 4.

The spacer 23 is fixedly connected, namely, welded, to the shaft wall 25, on the one hand, and to the bearing rail 21, on the other hand. The bearing rail 21 is thus mounted fixedly in this area. The bearing rail 21 has notches 33 on its top side in its two free legs. A guide strap 34 is arranged, namely, welded in this case, on the underside of the cover 26 at least in the area of the longitudinal edge of the cover 26. This guide strap 34 engages the corresponding notch 33 in a positive-locking manner. As a result, the cover 26 is mounted positively in the longitudinal direction of the bearing rail 21, but it can move freely transversal at right angles to the longitudinal direction of the bearing rail 21. The notches 33 are always arranged exactly above the spacer 23 forming the fixed mount 31 in this case. The fixed mount 31 is arranged exactly in the middle of the bearing rail 21 and the cover 26, so that the absolute values of the thermal expansion will be equal at the free ends of the bearing rails 21 and the cover 26. However, it is immediately clear that the movable mount 31 may also be arranged offset toward the center or even in the edge areas of the bearing rails 21 and of the cover 26. The notches 33 and the spacer 23 may also be arranged offset in relation to one another.

Figure 5:
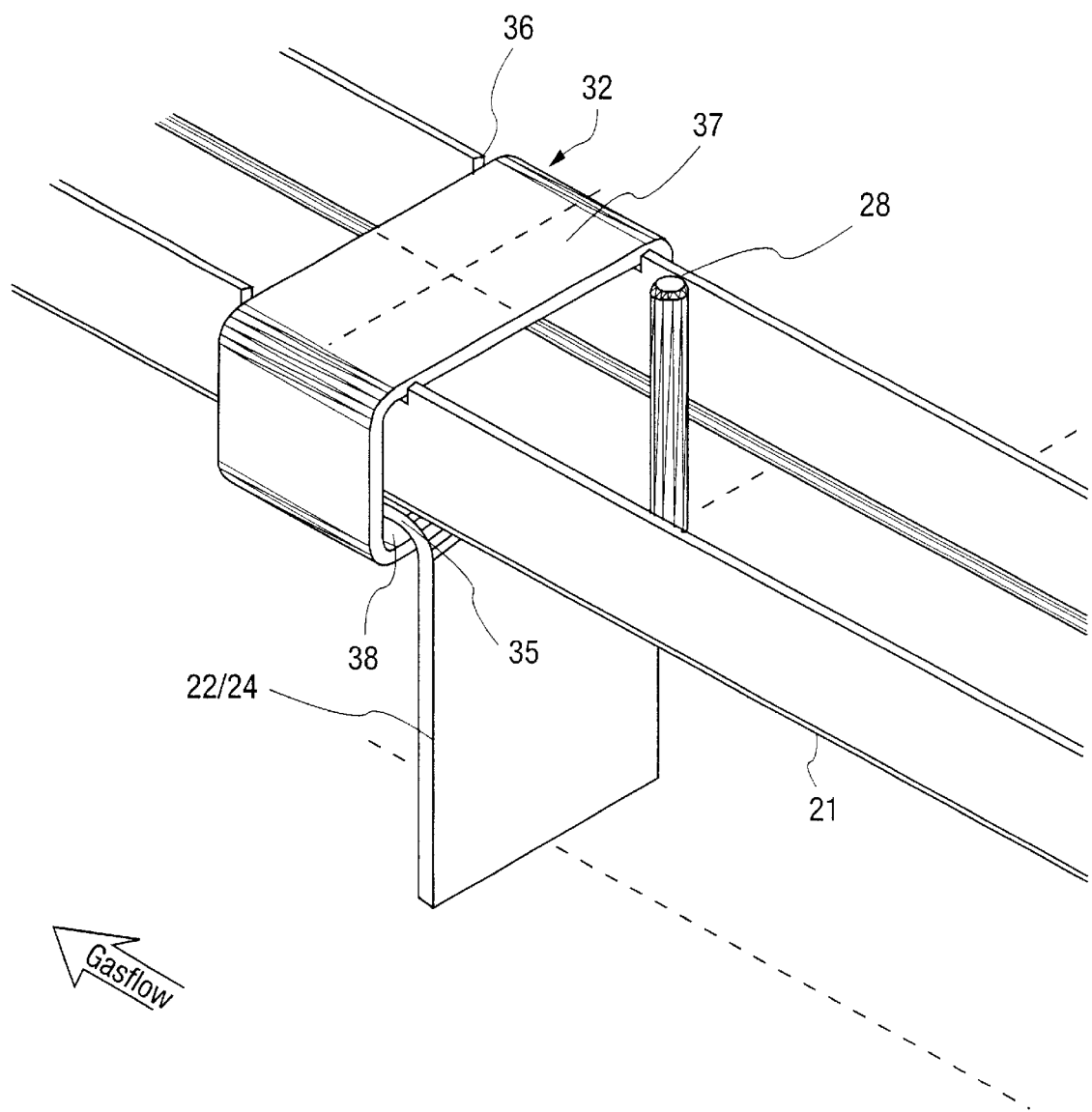
FIG. 5 is a perspective view of a movable mount area of the insulation system according to FIG. 1 in a partially assembled state.

The movable mount 32 is shown in greater detail in FIGS. 3 and 5.

As was mentioned above, the cover 26 lies freely on the free legs of the bearing rail 21 outside the area of the fixed mount 31 and is held only by the clamping, so that the cover 26 can expand freely in this area (floating mounting). The movable mount 32 for the bearing rail 21 is formed as follows: The spacers 22, 24 are again welded to the shaft wall 25. At their opposite ends, the spacers 22, 24 are bent in an L-shaped pattern, so that the bent-off leg 35 of the spacers 22, 24 is in contact with the underside of the bearing rail 21. Notches 36 are provided on the top side of the bearing rail 21 in the free legs of the bearing rail. This notch is engaged by an approximately rectangular ring 37, which is led around the bearing rail 21. A gap 38, which is engaged by the bent-off leg 35 of the respective spacer 23 and 24 with a certain clearance, is formed between the ring 37 and the underside of the bearing rail 21. Thus, the ring 37 can move freely together with the bearing rail 21 in the longitudinal direction of the bearing rail 21 in relation to the spacers 22, 24. The ring 37 is designed such that it exactly fits the notches 36 in a positive-locking manner.

Figure 5A:
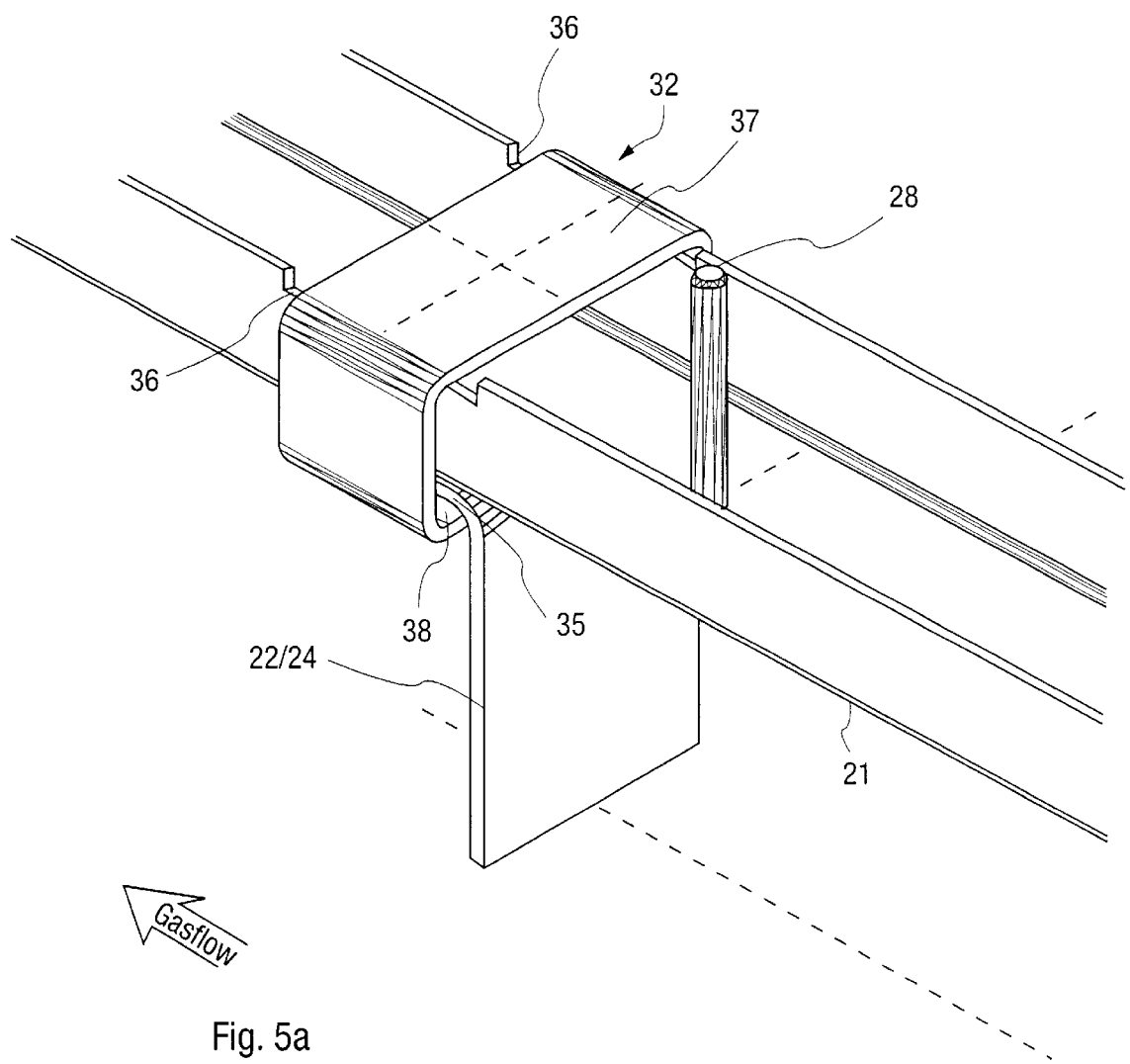
FIG 5a is a perspective view of the movable mount area of the insulation system according to FIG. 1 in a variant of FIG. 5.

Alternatives are, of course, conceivable for the movable mount 32. For example, the spacers 22, 24 may be welded to the ring 37 and the notches 36 may be so long that the ring 37 can be displaced with the necessary clearance in the longitudinal direction of the bearing rail 21. This variant is shown in FIG. 5a.

FIGS. 6 through 10 show an alternative exemplary embodiment of the present invention, which is especially suitable for parts of the exhaust gas guiding structure of a gas turbine which are not subject to very high velocities of flow, namely, the flue. The covers 39 for an insulation layer 40 are mounted on U-shaped bearing rails 41. However, the bearing rails 41 are designed as rails with an downwardly open U-shaped cross section in this case, so that the cover 39 lies flat on two adjacent bearing rails 41 in the area of its longitudinal edges. The cover 39 is held by clamping strips 42 in a non-positive manner. Just as in the above-described exemplary embodiment, the clamping strips 42 are held by means of stay bolts 43 and a nut 44, which is, e.g., a self-locking nut, and washers 45. As can be clearly recognized from FIGS. 7 and 8, the longitudinal side edges of the cover 39 are again spaced so wide apart from one another and from the stay bolts 43 that the covers 39 can freely expand on the side. Unlike in the above-mentioned exemplary embodiment, all holes 46 in the clamping strips 42, through which the stay bolts 43 are passed, are provided with a substantially larger diameter than the diameter of the stay bolts 43, which is also indicated in FIGS. 7 and 8.

The bearing rails 41 are fastened to the shaft wall 50 by spacers 47, 48, 49. The area of the middle spacer 48 is again designed as a fixed mount 51, while the area of the outer spacers 47, 49 is designed as a movable mount 52.

Figure 9:
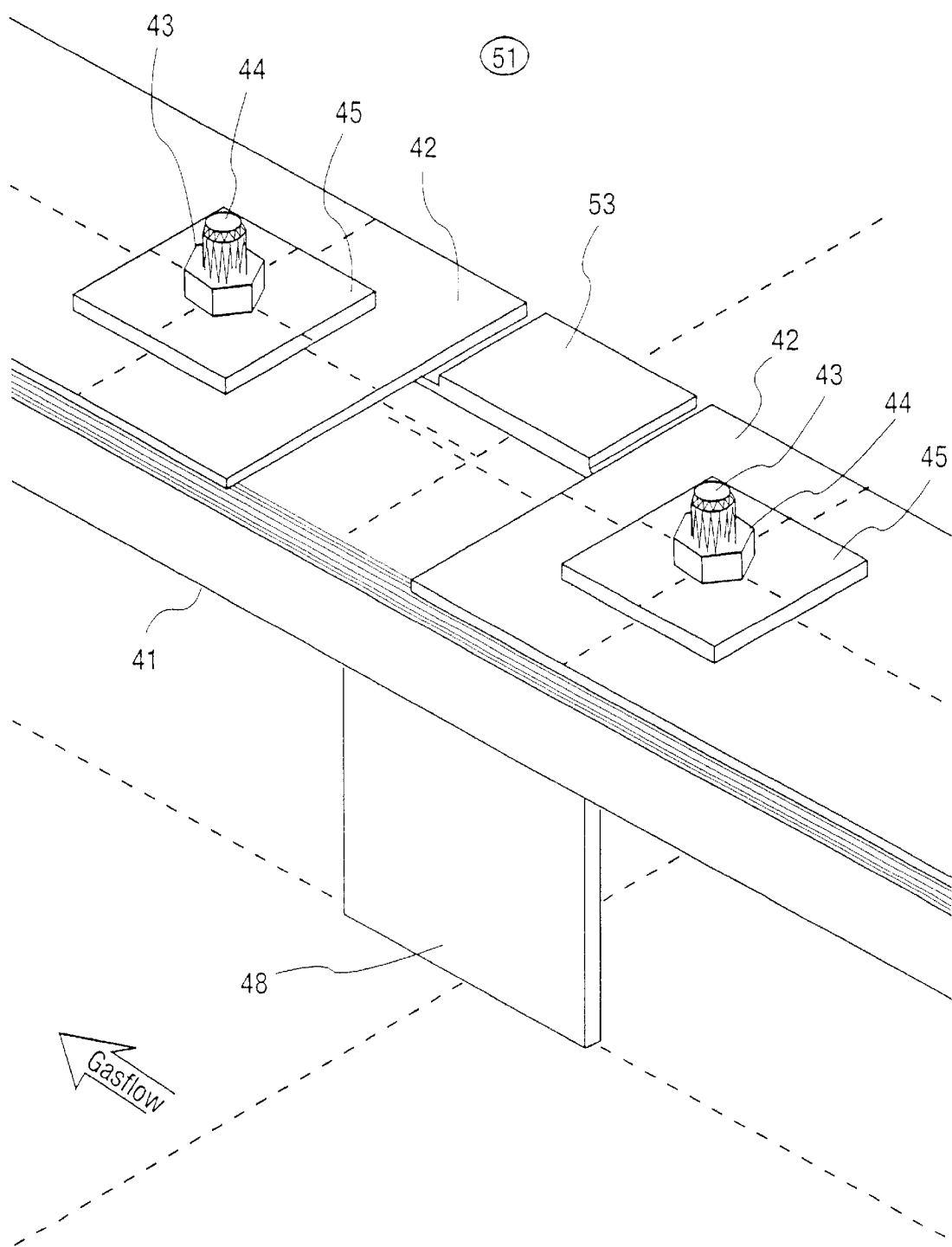
FIG. 9 is a perspective view of a fixed mount area of the insulation system according to FIG. 6 in a partially assembled state.

The fixed mount is shown in greater detail in FIGS. 7 and 9.

The spacer 48 is arranged here in a plane corresponding to the longitudinal direction of the bearing rails 41 and is fixedly connected, namely, welded, to the shaft wall 50, on the one hand, and to the bearing rail 41, on the other hand. The cover 39 has a guide strap 53 centrally in the area of its longitudinal side edge. However, this guide strap 53 is arranged in this case on the top side, i.e., on the side of the cover 39 facing the flow. Two clamping strips 42 are associated with each bearing rail 41. As can be clearly recognized from FIG. 9, the guide strap 53 is held between the two clamping strips 42 in a positive-locking manner. The cover 39 is thus again mounted in the manner of a fixed mount in its middle area when viewed in the longitudinal direction of the bearing rails 41.

Figure 10:
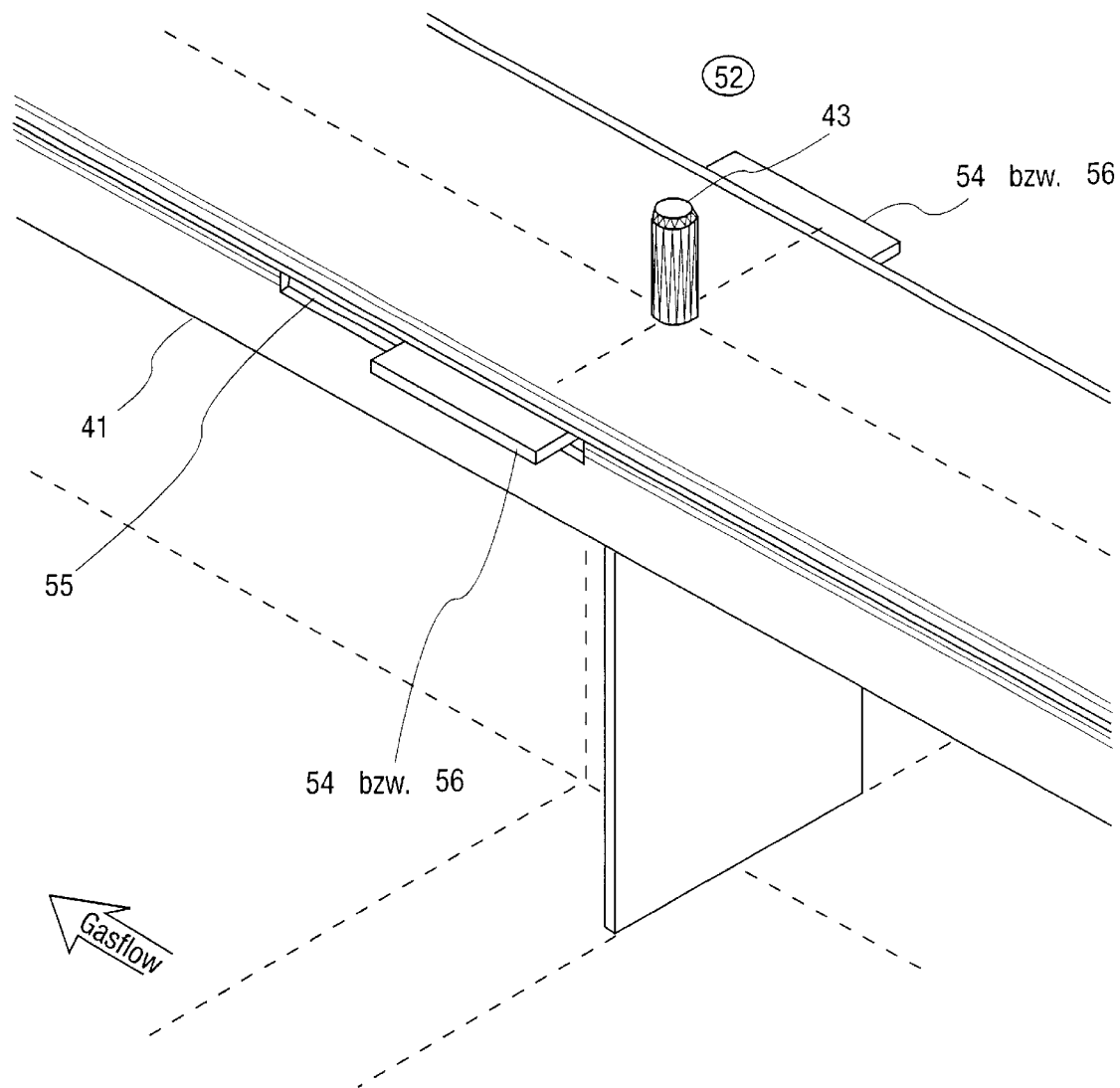
FIG. 10 is a perspective view of a movable mount area of the insulation system according to FIG. 6 in a partially assembled state.

The area of the movable mount 52 is shown in greater detail in FIGS. 8 and 10.

Just as in the above-mentioned exemplary embodiment, the cover 39 lies here freely on the bearing rails 41 and is held by the clamping strip 42, so that the cover 39 can expand freely after overcoming the frictional forces (floating mounting). The spacers 47, 49 are again welded to the shaft wall 50, and the plane of the spacers 47, 49 extends transversely at right angles to the longitudinal direction of the bearing rails 41. The spacers 47, 49 are first punched or cut out as T-shaped plates. The upper transverse leg 54 of the spacers 47, 49 is then bent by 90°, as can be clearly recognized from FIG. 10. The transverse leg 54 thus forms two lateral wings 56. A slot 55 each, which are engaged by the transverse leg 54 with the wings 56, is thus formed in the bearing rails 41 on the left and right. The spacers 47, 49, rotated by 90°, are first inserted into the downwardly open U of the bearing rail 41 and then again turned back by 90° into the position shown in FIGS. 8 and 10, while the transverse legs 54 are turned into the slots 55. The slots 55 are made so long that the bearing rail 41 can move freely on the spacers 47, 49 as a consequence of thermal expansion.

The guide strap 53 of the cover 39 is arranged above the spacer 48 forming the fixed mount 51 in the exemplary embodiment explained last as well. The fixed mount 51 for the bearing rail 41 and the guide strap 53 may, of course, be arranged offset in relation to one another in this case as well. The fixed mount 51 does not necessarily have to be provided exactly centrally in relation to the bearing rail 41, either. The fixed mount 51 may also be provided at the end area of the bearing rail 41.

Figure 11:
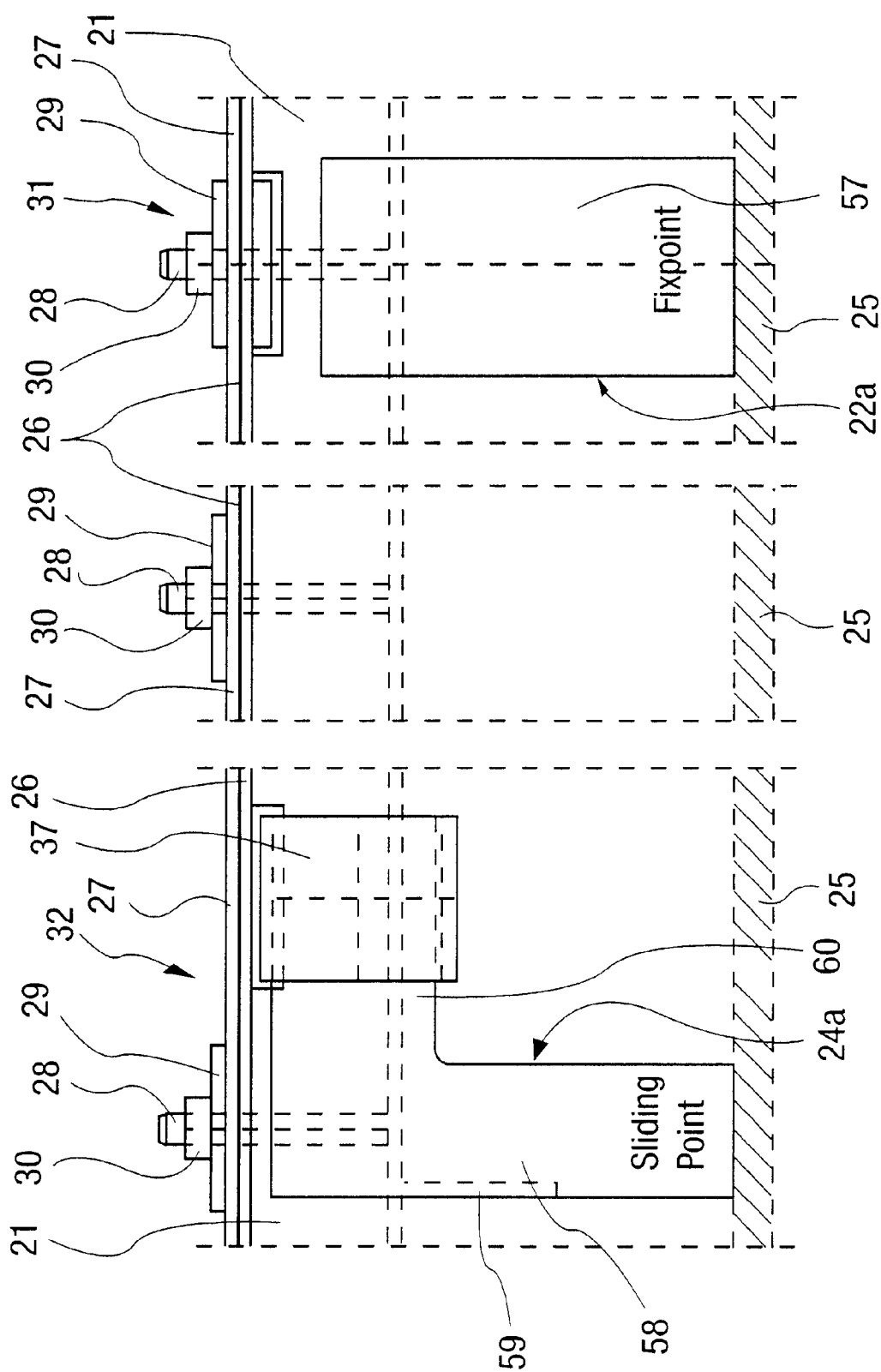
FIG. 11 is a side view of another variant of the movable mount area and of the fixed mount area of the insulation system according to FIG. 1.

Other variants of the embodiment of the fixed mount 31 and the movable mount 32 shown in FIGS. 1 through 5a are conceivable as well, and these variants are shown in FIGS. 11 through 13. Identical components are designated with the same reference numbers in FIGS. 11 through 13 as in FIGS. 1 through 5a. However, the spacers 23a for the fixed mount 31 and the spacers 24a for the movable mount 32 have a different design here. The spacer 23a for the fixed mount 31 is provided with two plate-shaped legs 31 arranged to the side of the bearing rail 21, and the said legs are fixedly connected, namely, welded, to the bearing rail 21, on the one hand, to the shaft wall 25, on the other hand. The plate-shaped legs extend in parallel to the longitudinal central plane of the bearing rails 21.

The spacer 24a for the movable mount 32 analogously also has plate-shaped, upright legs 58, which are likewise arranged on both sides of the bearing rail 21 and extend in a plane parallel to the longitudinal central plane of the bearing rail 21. The bar 59 is arranged under the bearing rail 21 and extends transversely at right angles to the longitudinal central plane of the bearing rail 21. The legs 58 are L-shaped in the side view (FIG. 11). If the shaft wall 25 is defined as "bottom," the legs 58 form an upside-down L. Furthermore, the legs 58 are connected to a likewise plate-shaped bar 59. With their horizontal legs 60, the legs 58 engage a gap 38, which is defined by the ring 37, on the one hand, and by the bearing rail 21, on the other hand, and is arranged on the right and left of the bearing rail 21. The legs 60 are thus arranged on the left and right next to the bearing rail 21 and no longer under the bearing rail 21, as in the variant according to FIG. 5.

While specific embodiments of the invention have been shown and described in detail to illustrate the application of the principles of the invention, it will be understood that the invention may be embodied otherwise without departing from such principles.

What is claimed is:

1. A hot gas flow shaft insulation system, comprising:
    an insulation layer;
    a flat cover which holds said insulation layer and covers said insulation layer against the gas flow;

bearing rails guiding said cover;

at least one movable mount; and a fixed mount, said bearing rails being fastened to a shaft wall with said fixed mount and said movable mount.

2. An insulation system in accordance with claim 1, wherein said fixed mount is a central fixed mount and said bearing rails are fastened to the shaft wall with at least one said movable mount on each side of said central fixed mount.

3. An insulation system in accordance with claim 1, wherein said fixed mount is formed by a spacer, which is fixedly connected to said bearing rail and is fixedly connected to said shaft wall.

4. An insulation system in accordance with claim 3, wherein said spacer is rigidly connected to said bearing rail by welding and said spacer is fixedly connected to said shaft wall by welding.

5. An insulation system in accordance with claim 1, wherein said movable mount comprises a spacer displaceable in relation to said bearing rail.

6. An insulation system in accordance with claim 5, wherein said spacer comprises a leg, said leg engaging a slot between said bearing rail and said ring fixed in a longitudinal direction of said bearing rail.

7. An insulation system in accordance with claim 6, wherein said leg engages said slot under said bearing rail.

8. An insulation system in accordance with claim 6, wherein another leg is provided, each of said leg and said another leg engaging said slot on a side next to said bearing rail, said legs being provided on both sides of said bearing rail.

9. An insulation system in accordance with claim 5, further comprising a ring, said spacer being fixedly connected to a ring mounted displaceably in relation to said bearing rail.

10. An insulation system in accordance with claim 6, further comprising wings, said spacer with said wings engaging said slots on said bearing rail in a longitudinally displaceable manner.

11. An insulation system in accordance with claim 1, wherein said cover and said bearing rails are connected to one another in a positive-locking manner in a certain area but otherwise in a non-positive manner.

12. An insulation system in accordance with claim 1, further comprising clamping strips for connecting between said cover and said bearing rails.

13. An insulation system in accordance with claim 11, wherein said cover and said bearing rails are connected to one another in a positive-locking manner in an area of said fixed mounts and are otherwise connected in a non-positive manner.

14. An insulation system in accordance with claim 11, further comprising a guide strap for holding said cover in a positive-locking manner in relation to said bearing rail and/or said clamping strips when viewed in the longitudinal direction of said bearing rail and for allowing free expansion in a transverse direction to said bearing rail.

15. An insulation system in accordance with claim 14, wherein said bearing rails have a notch engaged by said guide strap in a positive-locking manner.

16. An insulation system in accordance with claim 14, wherein said guide strap is held between two said clamping strips in a positive-locking manner.

17. A hot gas flow shaft insulation system for gas turbines, comprising:

an insulation layer;

a flat cover which holds said insulation layer and covers said insulation layer against the gas flow of the gas turbine;

bearing rails guiding said cover;

at least one movable mount; and a fixed mount, said bearing rails being fastened to a shaft wall with said fixed mount and said movable mount.

* * * * *